US011930963B2

(12) United States Patent
Stasin

(10) Patent No.: US 11,930,963 B2
(45) Date of Patent: Mar. 19, 2024

(54) CONDIMENT DISPENSER

(71) Applicant: Howard Robert Stasin, Ottery (ZA)

(72) Inventor: Howard Robert Stasin, Ottery (ZA)

(*) Notice: Subject to any disclaimer, the term of this patent is extended or adjusted under 35 U.S.C. 154(b) by 0 days.

(21) Appl. No.: 17/763,394

(22) PCT Filed: Sep. 23, 2020

(86) PCT No.: PCT/IB2020/058903
§ 371 (c)(1),
(2) Date: Mar. 24, 2022

(87) PCT Pub. No.: WO2021/059166
PCT Pub. Date: Apr. 1, 2021

(65) Prior Publication Data

US 2022/0330757 A1 Oct. 20, 2022

(30) Foreign Application Priority Data

Sep. 26, 2019 (GB) .................................... 1913905

(51) Int. Cl.
*A47J 42/34* (2006.01)
*A47J 42/04* (2006.01)
*A47J 42/10* (2006.01)
*A47J 42/38* (2006.01)

(52) U.S. Cl.
CPC .................................... *A47J 42/34* (2013.01)

(58) Field of Classification Search
CPC ................................. A47J 42/34; A47J 42/38
See application file for complete search history.

(56) References Cited

U.S. PATENT DOCUMENTS 2,407,808 A 9/1946 Bivans
2,690,881 A 10/1954 Mantelet
3,827,641 A 8/1974 Anderson
8,783,595 B2 7/2014 Delbridge et al.
2012/0286081 A1* 11/2012 Delbridge .............. A47J 42/20 241/169.1

(Continued)

FOREIGN PATENT DOCUMENTS

WO WO 2019/178363 9/2019

OTHER PUBLICATIONS

Plastics Solutions in Industrial & Commercial Products, Product Catalogue: 496.P, Retrieved from Internet, 2018.

(Continued)

*Primary Examiner* — Matthew Katcoff
*Assistant Examiner* — Mohammed S. Alawadi

(57) ABSTRACT

A condiment dispenser (10) with a grinding mechanism (28) according to the present invention comprises: a first part (26) defining an aperture (24) and surrounding inner surface (32), both with lobed cross-sectional profiles; and a second part (36) that is inside the first part (26) and can rotate about an axis (16) relative to the first part (26). The second part (36) has an outer surface (42) and the second part (36) and outer surface (42) both have lobed cross-sectional profiles. The inner surface (32) of the first part (26) and the outer surface (42) of the second part (36) are spaced apart by a gap (38) which is larger at a receiving side (48) of the grinding mechanism (28) and narrows in the axial direction towards a dispensing side (50) of the grinding mechanism (28).

16 Claims, 4 Drawing Sheets

(56) References Cited

U.S. PATENT DOCUMENTS

| | | | | |
|---|---|---|---|---|
| 2014/0070038 | A1 | 3/2014 | Wade et al. | |
| 2016/0015214 | A1 | 1/2016 | Laegsgaard | |
| 2022/0175189 | A1 * | 6/2022 | Davidson ................ | A47J 42/04 |

OTHER PUBLICATIONS

International Preliminary Report on Patentability dated Oct. 18, 2021 From the International Preliminary Examining Authority Re. Application No. PCTIIB2020/058903. (13 Pages).
International Search Report and the Written Opinion dated Mar. 18, 2021 From the International Searching Authority Re. Application No. PCT/IB2020/058903 and Its Translation of Search Report Into English. (6 Pages).
Patents Act 1977: Search Report under Section 17 dated Mar. 3, 2020 From the Intellectual Property Office of the United Kingdom of Great Britain Re. Application No. GB 1913905.4 (5 Pages).

* cited by examiner

CONDIMENT DISPENSER

RELATED APPLICATIONS

This application is a National Phase of PCT Patent Application No. PCT/IB2020/058903 having International filing date of Sep. 23, 2020, which claims the benefit of priority of United Kingdom Patent Application No. 1913905.4 filed on Sep. 26, 2019. The contents of the above applications are all incorporated by reference as if fully set forth herein in their entirety.

FIELD AND BACKGROUND OF THE INVENTION

This invention relates to condiment dispensers of the type comprising a grinding mechanism attached to the top of a container such as a bottle.

Various condiments are preferred freshly ground when added to foods and historically, such condiments were ground in mortar and pestles, in burr grinders or the like. Pepper mils were developed with a knob at an upper end of an elongate container filled with peppercorns, and a grinding mechanism at the lower end of the container, that is driven by rotation of the knob and which dispenses ground pepper from the grinding mechanism.

In more recent developments, grinding mechanisms similar to traditional pepper mills, have been applied to the upper ends of containers such as glass or plastic bottles or jars, to serve as closures for the bottles and as grinding dispensers. These bottles are widely used for storage of a variety of condiments, which are ground and dispensed on demand, by inverting the bottles and manually rotating outer parts of the grinding mechanisms. These bottles are commonly referred to as "spice grinders", even though they are used for a variety of particulate condiments.

Current spice grinders typically comprise of a stationary element which is secured to the open upper end of a bottle or jar by screw-threaded attachment or by being clipped onto the bottle, and a rotating element that is permanently clipped onto the stationary part, to rotate about a common upright axis. The rotating part includes an outer ring that is gripped by hand, to rotate it, but also includes a central tapering part with a cone-like shape. A gap is defined between the cone-like part and inner walls of the stationary part and these parts are generally configured similarly to the corresponding parts of a burr grinder, with longitudinal ridges along the inner walls of the stationary part and spiral grooves and ridges along the tapering outside of the cone-like part. In use, the bottle is inverted so that particulate condiments inside the bottle are fed under gravity into the gap between the two parts of the grind mechanism and as the rotating part is turned by hand, the particulate condiments are urged downwards by the spiral grooves and are crushed and/or ground in the narrowing gap between the opposing surfaces of the stationary and rotating parts, until it is dispensed. The grinding mechanism is usually covered, when not in use, with a removable cap.

The bottles or jars for these spice grinders are typically made of glass or a polymeric material such as PET, while the parts of the grinding mechanisms are made of different materials, such as a tough polymeric material for the outer ring of the rotating part and the screw-threaded part of the stationary part, with abrasion resistant materials such as harder polymers or ceramics for the surfaces between which the condiments are ground. The combinations of materials increase the costs of these grinders and makes it difficult to recycle them cost-effectively.

There is a perception that spice grinders of which the working parts, i.e. the ridges on the inner surface of the stationary outer part and the spiral grooves and ridges on the cone-like rotating inner part, are made of polymeric materials, are prone to break and broken plastic parts may be dispensed into a consumer's food.

The caps of these conventional spice grinders are often lost with the result that the bottles or jars stand upright, when not in use, with their grinding mechanisms open to collect dirt that could contaminate the condiments. The absence of caps also means that the condiments inside the bottles or jars are open to atmosphere via the gaps in the grinding mechanisms, so that the condiments could deteriorate, e.g. from prolonged exposure to humidity that is too high or low.

The present invention seeks to improve various shortfalls of existing spice grinders, mentioned above, but in addition, it seeks to provide spice grinders that work effectively, easily, and reliably, and are cost-effective.

SUMMARY OF THE INVENTION

According to a first aspect of the present invention there is provided a condiment dispenser having a grinding mechanism, the grinding mechanism having an axis and comprising:

a first part defining an aperture surrounded by an inner surface, the aperture and inner surface having a lobed cross-sectional profile; and a second part that is disposed inside the first part and that has an outer surface, the second part being rotatable about the axis relative to the first part, and the second part and outer surface having a lobed cross-sectional profile;

wherein the inner surface of the first part and the outer surface of the second part are spaced apart by a gap which is larger at a receiving side of the grinding mechanism and narrows in the axial direction towards a dispensing side of the grinding mechanism.

The term "lobed" refers to a cross-sectional profile which is not circular, but defines one or more rounded lobes protruding outwards, and the term includes oval and elliptical cross-sectional profiles, each comprising two opposing lobes, but also includes profiles with a single lobe, or more than two lobes.

The cross-sectional profile of the outer surface of the second part may increase in size from the receiving side towards the dispensing side of the grinding mechanism. Instead, or in addition, the cross-sectional profile of the inner surface of the first part may decrease in size from the receiving side towards the dispensing side of the grinding mechanism.

The second part may be connected to a grip formation, to rotate about the axis, along with the grip formation, and the grip formation may extend on the outside of the grinding mechanism.

The condiment dispenser may include a container defining an inner cavity and an opening, the cavity being on the receiving side of the grinding mechanism and being in communication with the gap between the inner surface of the first part and the outer surface of the second part.

The first part may be integrally formed with the container, around the opening, and the second part may be clipped onto the first part. Instead, the first part may be attachable to the container, to be disposed in the proximity of the opening.

The condiment dispenser may include a plurality of ridges formed on the inner surface of the first part.

The first part and the second part may be made of the same materials, e.g. PET.

The condiment dispenser may include a cap that is connected to the second part by at least one flexible element, the cap defining a seal and being displaceable between a closed position in which the seal is received on the second element and covers the gap between the first and second parts, and an open position in which the seal is free from the second part. The cap may be integrally formed with the second part.

The inner surface of the first part and the outer surface of the second part may be shaped and configured such that the gap by which they are spaced apart, varies in size in a circumferential direction, at the dispensing side of the grinding mechanism.

BRIEF DESCRIPTION OF THE SEVERAL VIEWS OF THE DRAWINGS

For a better understanding of the present invention, and to show how it may be carried into effect, the invention will now be described by way of non-limiting example, with reference to the accompanying drawings in which.

DESCRIPTION OF SPECIFIC EMBODIMENTS OF THE INVENTION

Figure 1:
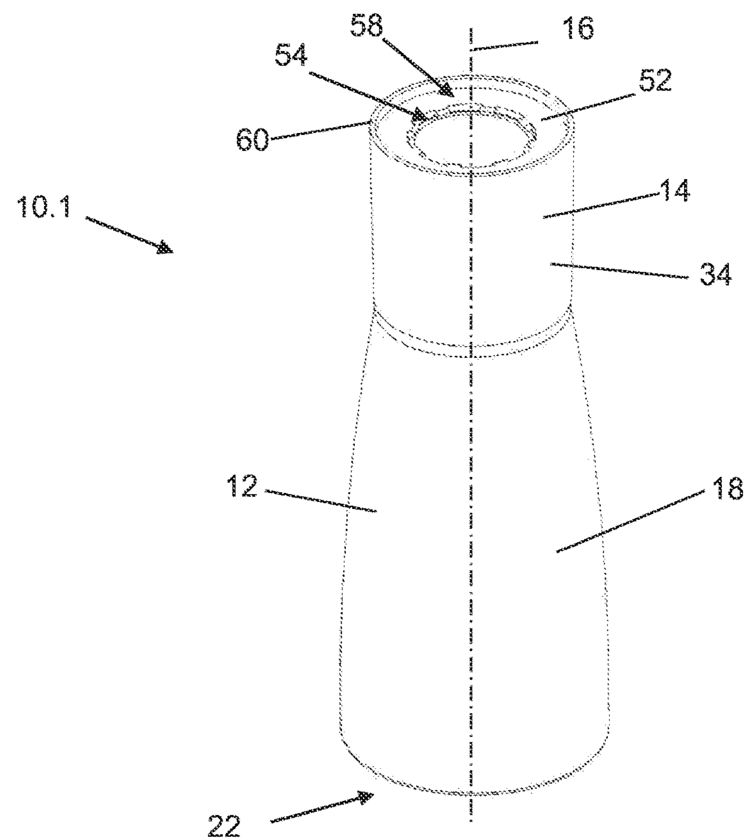
FIG. 1 is a three-dimensional view of a first embodiment of a condiment dispenser according to the present invention.
Figure 2:
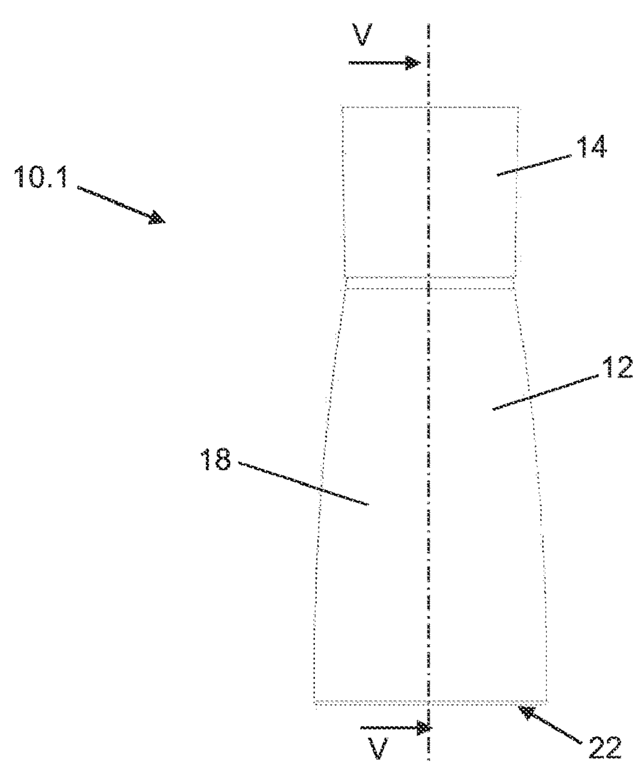
FIG. 2 is a side view of the condiment dispenser of FIG. 1.
Figure 3:
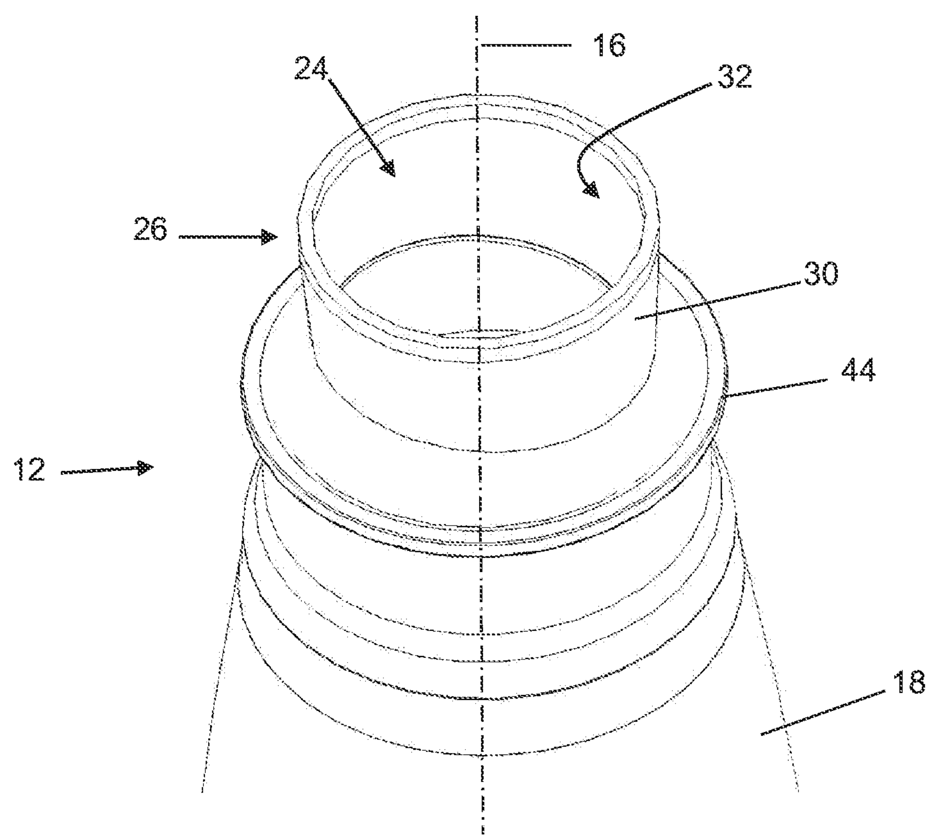
FIG. 3 is a detail top three-dimensional view of a stationary part of the condiment dispenser of FIG. 1.
Figure 4:
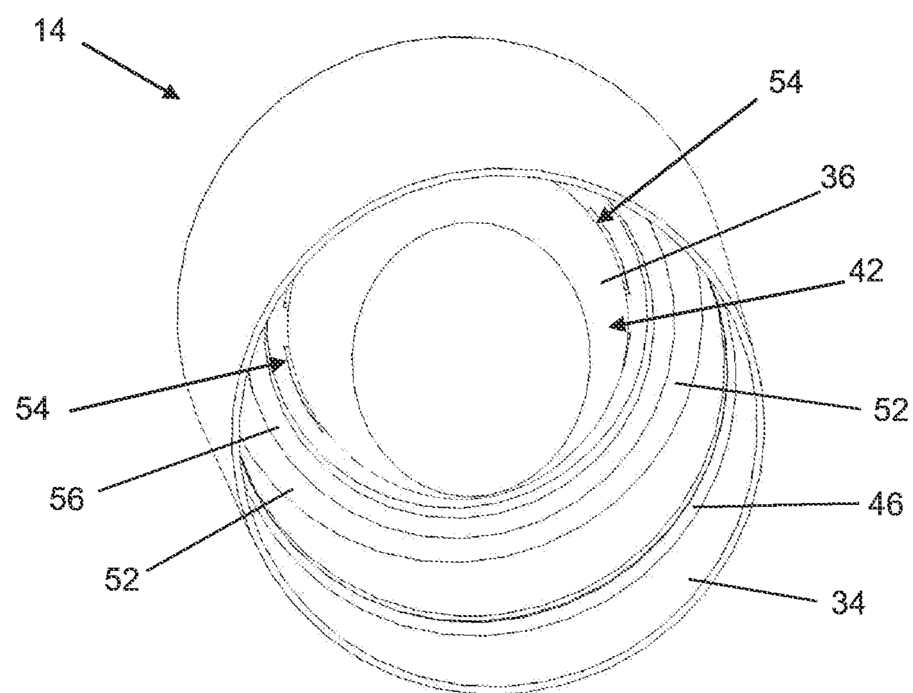
FIG. 4 is a bottom three-dimensional view of a rotary part of the condiment dispenser of FIG. 1.
Figure 5:
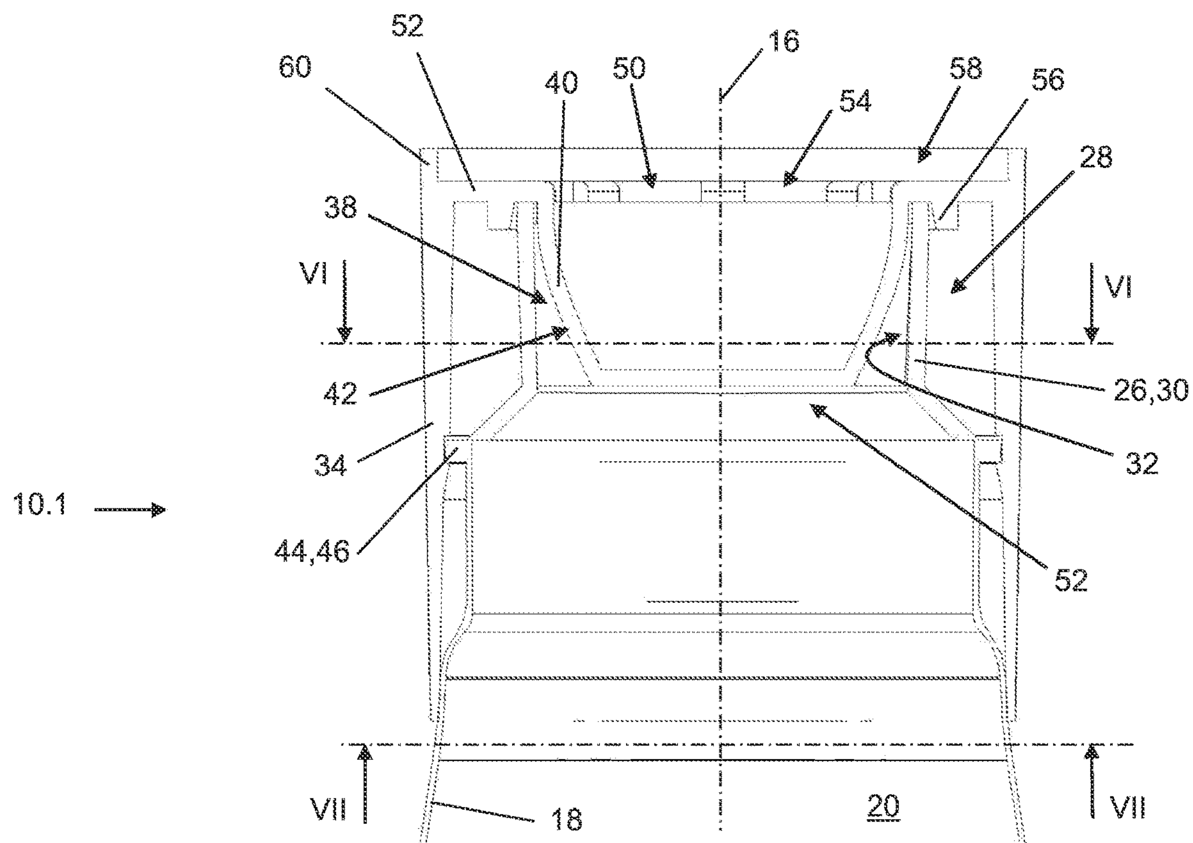
FIG. 5 is a detail sectional side view of an upper part of the condiment dispenser of FIG. 2, taken at V-V.
Figure 6:
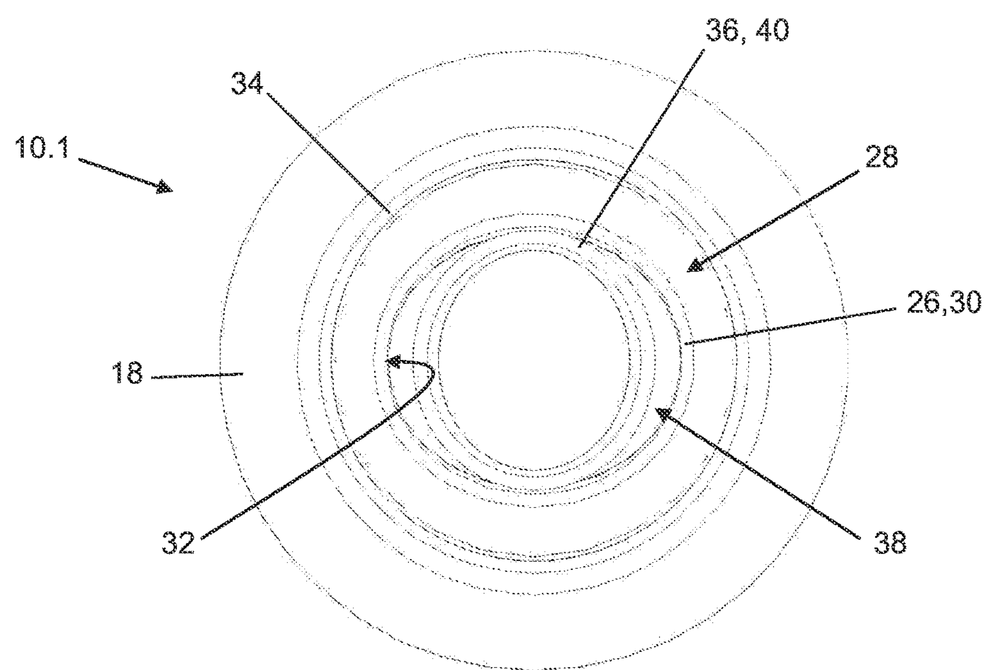
FIG. 6 is a cross-sectional view of the condiment dispenser of FIG. 5, taken at VI-VI.

Referring to the drawings, embodiments of condiment dispensers according to the present invention are identified, generally, by reference sign 10 and to distinguish between the first embodiment of the condiment dispenser shown in FIGS. 1 to 6 and the second embodiment, the first embodiment is identified by reference sign 10.1 and the second embodiment by reference sign 10.2. Features that are common between the two embodiments are identified by the same reference signs—with suffixes, where required.

Referring to FIGS. 1 to 6: The condiment dispenser 10.1 comprises of a stationary part 12 and a rotary part 14 and has an axis 16. The stationary part 12 includes a container, which in the illustrated example is in the form of a bottle 18 that defines an inner cavity 20 and a generally flat bottom 22 on which the bottle can stand upright, when not in use. At the opposite end of the bottle 18 (the upper end, when the bottle stands upright), the bottle defines an aperture or opening 24.

The part of the bottle 18 extending around the opening 24, forms a first part 26 of a grinding mechanism 28 of the condiment dispenser 10.1. The first part 26 includes an upright wall 30 that extends around the opening 24 and part of the opening and an inner surface 32 of the wall that extends around the opening, have a lobed cross-sectional profile, which in the illustrated embodiment is an oval cross-sectional profile (as can best be seen in FIG. 6). In the illustrated embodiment, the opening 24, wall 30 and inner surface 32 have a circular cross-sectional profile at their top, and widen slightly on two opposing sides of the axis 16, in the downward direction, so that they have an oval cross-sectional profile at their bottom. However, in other embodiments, the wall 30 and surface 32 can be symmetrical about the axis 16 and generally parallel on opposing sides of the axis, so that the cross sectional profile of the inner surface and the opening 24, does not change much in the axial direction.

The rotary part 14 of the condiment dispenser 10.1 includes an outer grip formation 34 and an inner part that forms a second part 36 of the grinding mechanism 28. The second part 36 fits inside the first part 26, spaced apart with a gap 38 between the first and second parts. The second part 36 has a wall 40 with an outer surface 42 and the lower part of the wall and outer surface have a lobed cross-sectional profile, which in the illustrated embodiment is an oval cross-sectional profile (as can best be seen in FIGS. 4 and 6). The cross-sectional profile of the second part 36 is larger and generally circular at its top, where the gap 38 is small, and it tapers towards its bottom, where it is spaced farther apart from the first part 26 and has a definite oval cross-sectional profile.

The bottle 18 defines a circumferential ridge 44 on its outside and the grip formation 34 defines a groove 46 on its inside in which the ridge 44 can be received with a clip action, to hold the rotary part 14 on the stationary part 12, but the engagement between the groove 46 and ridge 44 has sufficient play for the rotary part 14 to rotate easily about the axis 16, relative to the stationary part 12. In other embodiments, the rotary part 14 can be attached to the stationary part 12 in other ways, but the attachment shown in the illustrated embodiment holds benefits of simplicity and effectiveness, with concomitant advantages of low cost, reliability, etc.

The grinding mechanism 28 has a receiving side 48 facing towards the cavity 20 and a dispensing side 50 on the outside of the condiment dispenser 10.1, which faces upwards when the condiment dispenser is in the upright orientation (as shown in the drawings). The gap 38 between the inner surface 32 of the first part 26 and the outer surface 42 of the second part 36 is larger at the receiving side 48 of the grinding mechanism 28, where it is in communication with the cavity 20. Owing to the oval cross-sectional profiles of the first and second parts 26,36 at the receiving side 48, the gap 38 can be of similar size along the peripheries of these parts if the two oval profiles are perfectly aligned, but the first part and second part can rotate relative to each other about the axis 16 and in most cases, the size of the gap 38 will vary along the peripheries of the first and second parts in a circumferential direction. At the dispensing side 50, both the first and second parts 26,36 have circular cross-sectional profiles and the gap 38 between them is small and is generally constant around their circumferences.

In the first embodiment of the dispenser 10.1, the size of the inner, second part 36 increases substantially from the receiving side 48 to the dispensing side 50, whereas the size of the outer, first part 26 remains more constant. This could be different in other embodiments of the invention, and either or both of the inner and outer parts can taper in size, as long as the overall size of the gap 38 reduces from the receiving side 48 towards the dispensing side. Similarly, in the illustrated embodiment the cross-sectional profiles of both the outer, first part 26 and the inner, second part 36 are more pronouncedly oval at the receiving side and change gradually to circular profiles at the dispensing side 50. This is preferable in many circumstances, but the invention could also work if either or both of these parts are oval at the dispensing side (in which case some other restriction would be required to prevent oversized granules from being dispensed).

The outer grip formation 34 is connected to the inner second part 36 by a flange 52, and eight dispensing apertures 54 are spaced apart in a circumferential arrangement, so that they are aligned with the upper end of the gap 38 at the dispensing side 50. The rotary part 14 includes a ridge 56 below the flange 52, that extends on the outside of the upper end of the wall 30 and can assist in preventing outward bending of the wall, during operation of the grinding mechanism 28.

The entire stationary part 12, including the bottle 18 and the first part 26 of the grinding mechanism 28, is a unitary moulding and is made of a suitably durable material, such as PET. It is possible, in other embodiments of the invention, to manufacture the first part 26 in a configuration that can be attached to the upper end of a separate bottle and in such a case, the first part 26 and the bottle may be of separate materials, e.g. the bottle may be glass. However, using a single material for both the bottle 18 and first part 26 holds the advantages of low manufacturing cost and simplicity of recycling the materials. Similarly, the entire rotary part 16 is made as a unitary component in a suitable durable material and in a preferred embodiment of the invention, the rotary part and stationary part 12 are both made of the same material, e.g. PET, so that the entire condiment dispenser 10.1 can be recycled without a need to separate different parts.

If desired, the grip between the inner surface 32 and condiment granules can be improved by providing small ridges on the inner surface, that preferably extend in the axial direction.

The rotary part 14 defines a recess 58 at its top, which is surrounded by a circumferential ridge 60. A cap (not shown) can fit into this recess 58, preferably by clipping onto the ridge 60, to cover the dispensing apertures 54, to prevent contamination and prevent moisture from entering the cavity 20 along the gap 38, or escaping from the cavity along the gap. In a preferred embodiment, the cap is connected to the rotary part 14 with a flexible element, so that the cap does not get lost, when it is removed from the recess 58 during use. The cap and its flexible element are preferably integrally formed with the rotary part 14, e.g. in a unitary moulding.

In the embodiment of a dispenser 10.1, both the first part 26 and second part 36 of the grinding mechanism 28 have oval cross-sectional profiles, i.e. each of these parts has a cross-sectional profile with two opposing lobes, but they could each have any number of lobes and the numbers of lobes on the two parts do not need to be the same. However, the use of two lobes on each cross-sectional profile is preferred, because it provides a balance of forces about the axis 16, as condiments are crushed between the first and second parts 26,36 and because the mechanical advantage provided by the taper of the gap 38 about the axis, will be diminished if either or both of the first and second parts have more lobes than two.

In use, the cavity 20 is filled at least partly with particulate condiments such as peppercorns, salt crystals, seeds, or the like, and the dispenser 10.1 is provided to end-users as a disposable item. The dispenser 10 is normally stored in its upright orientation (as shown in the drawings) and the dispensing side 50 of the grinding mechanism 28 is covered with the cap.

When a user wants to dispense ground condiment, the cap is removed and the dispenser 10.1 is inverted. The outer grip formation 34 is gripped by hand and is manually rotated about the axis 16 relative to the bottle 18, so that the two parts 26,36 of the grinding mechanism 28 are rotated relative to each other. The rotary movement may be repeated in opposing directions (oscillating movement), or may be in a single direction and may be continuous or interrupted.

While the parts 26,36 of the grinding mechanism rotate relative to each other, the inverted orientation of the dispenser 10 causes the particulate condiments to move under gravity from the cavity 20 into the gap 38. The relative rotary motion of the oval first and second parts 26,36 at the receiving side of the grinding mechanism 28 causes the particulate condiments to be crushed between the inner surface 32 and outer surface 42 and the slight taper in the gap 38 between these two surfaces provides a mechanical advantage so that relatively little force is required to rotate the parts 26,36 to achieve the desired crushing effect.

In this respect, it should be noted that condiment dispenser 10.1 provides mechanical advantage in at least two ways. The first mechanical advantage results from the fact that the outer circumference of the outer grip formation 34 is substantially larger and is disposed at a greater radius from the axis 16, than the surfaces 32,42 on opposing sides of the gap 38. The second mechanical advantage results from the gradual narrowing of the tapering gap 38 between the oval surfaces 32,42, when rotary part 14 is rotated, so that the surfaces 32,42 operate in a wedge action, with relatively large rotation of the rotary part 14 resulting in a small reduction in the gap 38.

As the relative rotation between the parts 26,36 of the grinding mechanism 28 continues, the particle sizes of the condiments are reduced and the condiment particles move under gravity in the direction of the dispensing apertures 54, while being crushed further in the narrowing gap 38, between the surfaces 32,42, until the condiment particles have been reduced to a size small enough to pass through the gap 38 at the dispensing side 50, to be dispensed under gravity through the apertures 54.

The reliance of the grinding mechanism 28 on gradual variations in the gap 38 between the lobed (oval) surfaces 32,42, provides a smoother tactile experience and easier operation to the user, than conventional spice grinders and it does away with the need for pronounced ridges on the moving parts—which in conventional spice grinders could be prone to breakage.

Figure 7:
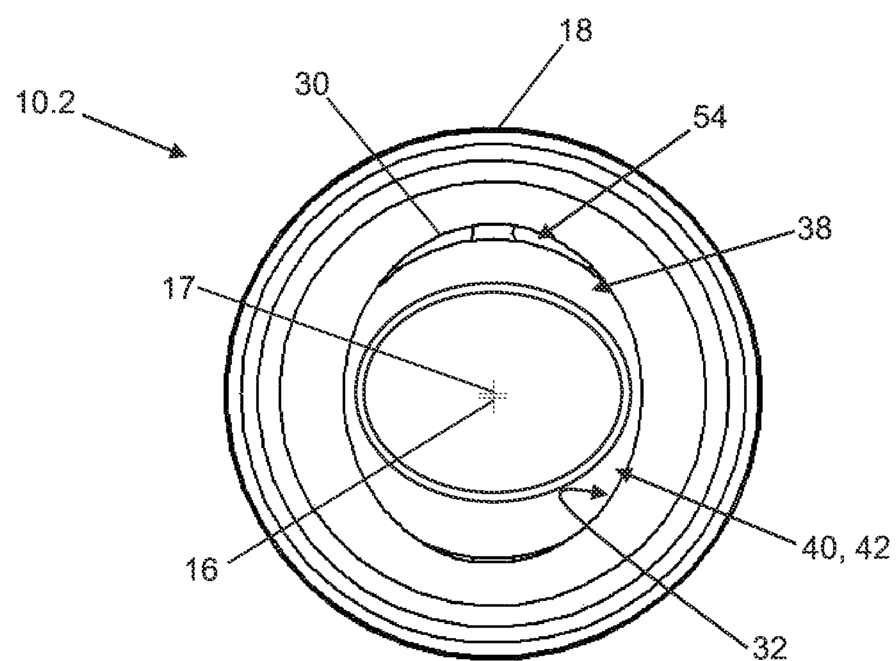
FIG. 7 is a cross sectional view of a second embodiment of a condiment dispenser according to the present invention, taken at the section shown in FIG. 5 as VII-VII (even though FIG. 5 shows the first embodiment of the condiment dispenser).

Referring to FIG. 7, the second embodiment of the condiment dispenser 10.2 is practically identical to the first embodiment 10.1 shown in FIGS. 1-6 and described above. The only difference is that the wall 30 is shaped at the dispensing side 50 so that its inner surface 32 is symmetrical about an axis 17, which is slightly set off from the rotational axis 16. As a result, the gap 38 between the inner surface 32 and outer surface 42 varies slightly in a circumferential direction at the dispensing side 50. This variation in the gap 38 causes finer condiment particles to be crushed between the surfaces 32,42 as they are rotated in the gap 38 about the axis 16, by rotation of the wall 40.

In another embodiments of the invention, which are variations on the second embodiment, the wall 40 may be shaped so that its outer surface 42 is symmetrical about an axis that is slightly set off from the rotational axis 16, or the inner surface 32 and/or outer surface 42 may be asymmetrical about the axis 16 at the discharge side—so that the gap 38 varies in size in the circumferential direction, at the discharge side 50.

The invention claimed is:

1. A condiment dispenser having a grinding mechanism, said grinding mechanism having an axis and comprising:

a first part defining an aperture surrounded by an inner surface, said aperture and inner surface having a non-circular, lobed cross-sectional profile which defines at least one rounded lobe protruding outwards; and a second part that is disposed inside the first part and that has an outer surface, said second part being rotatable about the axis relative to the first part, and said second part and outer surface having a non-circular, lobed cross-sectional profile which defines at least one rounded lobe protruding outwards;

wherein the inner surface of the first part and the outer surface of the second part are spaced apart by a gap which is larger at a receiving side of the grinding mechanism and narrows in the axial direction towards a dispensing side of the grinding mechanism;

wherein the second part is connected to a grip formation, to rotate about the axis, along with the grip formation; and wherein the gap between the inner surface of the first part and the outer surface of the second, varies in size in a circumferential direction.

2. The condiment dispenser according to claim 1, wherein the cross-sectional profile of the outer surface of the second part increases in size from the receiving side towards the dispensing side of the grinding mechanism.

3. The condiment dispensed according to claim 1, wherein the cross-sectional profile of the inner surface of the first part decreases in size from the receiving side towards the dispensing side of the grinding mechanism.

4. The condiment dispenser according to claim 1, wherein the grip formation extends about the outside of the grinding mechanism.

5. The condiment dispenser according to claim 1, which includes a container defining an inner cavity and an opening, said cavity being on the receiving side of the grinding mechanism and being in communication with the gap between the inner surface of the first part and the outer surface of the second part.

6. The condiment dispenser according to claim 5, wherein the first part is integrally formed with the container, around the opening.

7. The condiment dispenser according to claim 6, wherein the second part is clipped onto the first part.

8. The condiment dispenser according to claim 5, wherein the first part is attachable to the container, to be disposed in the proximity of the opening.

9. The condiment dispenser according to claim 1, which includes a plurality of ridges formed on the inner surface of the first part.

10. The condiment dispenser according to claim 1, in which the first part and the second part are made of the same materials.

11. The condiment dispenser according to claim 10, in which the first part and the second part are made of PET.

12. The condiment dispenser according to claim 1, which includes a cap that is connected to the second part by at least one flexible element, said cap defining a seal and being displaceable between a closed position in which the seal is received on the second element and covers the gap between the first and second parts, and an open position in which the seal is free from the second part.

13. The condiment dispenser according to claim 12, in which the cap is integrally formed with the second part.

14. The condiment dispenser according to claim 1, wherein the inner surface of the first part and the outer surface of the second part are shaped and configured such that the gap by which they are spaced apart, varies in size in a circumferential direction, at the dispensing side of the grinding mechanism.

15. The condiment dispenser according to claim 1, in which the inner surface of the aperture of the first part has an oval cross-sectional profile.

16. The condiment dispenser according to claim 1, in which the outer surface of the second part has an oval cross-sectional profile.

* * * * *